UNITED STATES PATENT OFFICE.

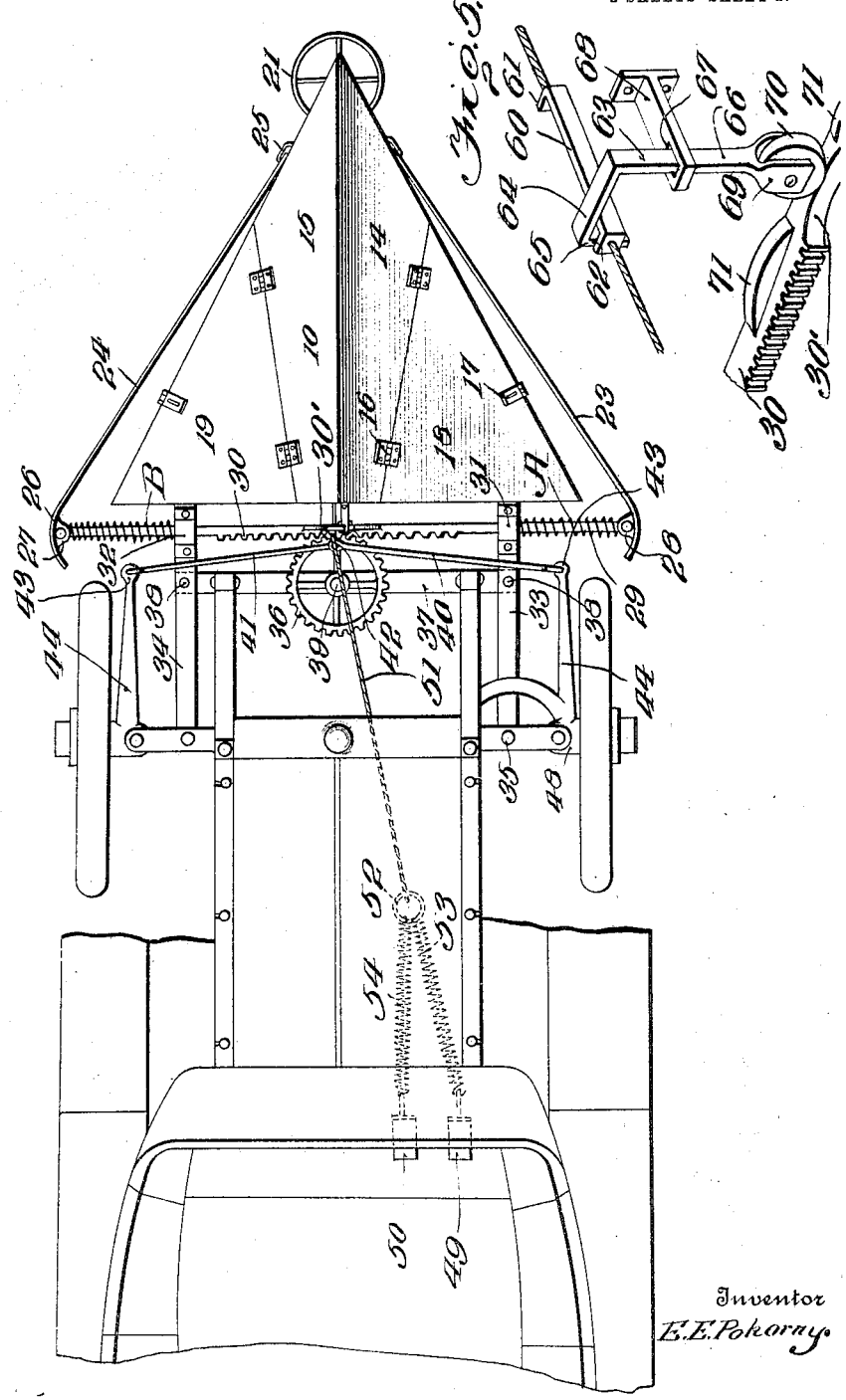

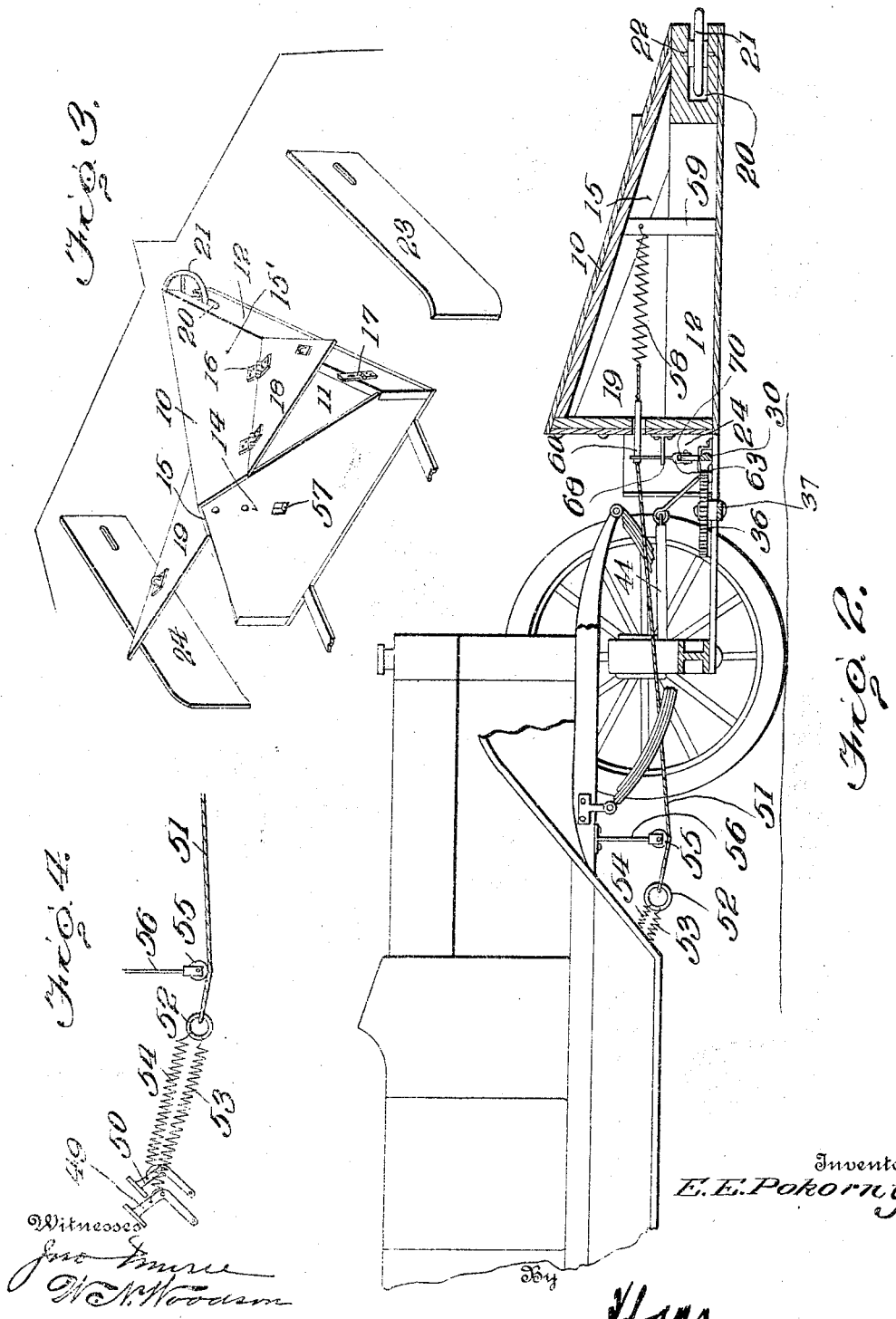

EDWARD E. POKORNY, OF SILVER LAKE, MINNESOTA.

AUTOMOBILE-FENDER.

1,132,117.  Specification of Letters Patent.  Patented Mar. 16, 1915.

Application filed May 19, 1914. Serial No. 839,597.

*To all whom it may concern:*

Be it known that I, EDWARD E. POKORNY, citizen of the United States, residing at Silver Lake, in the county of McLeod and State of Minnesota, have invented certain new and useful Improvements in Automobile-Fenders, of which the following is a specification.

This invention relates to new and useful improvements in automobile fenders, and as its principal object aims to provide a device of this character which may be so attached to an automobile that it will, when striking any foreign object, automatically act to deflect or turn the fore-wheels of the vehicle and simultaneously release the clutch and apply the emergency brakes.

A further object is to construct the fender with such regard to number, proportion and arrangement of parts that it may be cheaply manufactured, will be durable and efficient in its action, and may be quickly and easily attached to any standard form of automobile with a minimum expenditure of time and labor.

A still further object is the provision of a fender which, as well as performing all of the offices of an ordinary fender, is so designed that it may be used either as an auxiliary gasolene tank or as a tool box.

The above and additional objects are accomplished by such means as are illustrated in the accompanying drawings, described in the following specification, and then more particularly pointed out in the claims, which are appended hereto and form a part of this application.

With reference to the drawings, wherein there has been illustrated the preferred embodiment of this invention as it is reduced to practice, and throughout the several views of which similar reference numerals designate corresponding parts, Figure 1 is a top plan view of an automobile with the fender attached in operative position; Fig. 2 is a side elevation of an automobile showing a longitudinal section through the fender with the apparatus in assembled position; Fig. 3 is a detail perspective view of the body portion of the fender and movable wing members which are carried thereby and automatically deflect the wheels when the fender strikes a foreign object; Fig. 4 is a diagrammatic view of the manner in which the clutch and brake lever of the automobile are operably connected by cables to the body of the fender; and Fig. 5 is a detail perspective view of the latch and keeper employed in holding the clutch and brake pedal cable in slack position. The central portion of the rack bar which controls the latch and keeper is also illustrated in this figure.

In the embodiment of the invention illustrated in the accompanying drawings, there is provided a box-like fender body which is rigidly attached to the front axle of a vehicle in advance of the front wheels and carries a pair of movable wings which, upon being engaged with a foreign obstacle in the road, are adapted, through the medium of an operatively connected rack bar, pinion and connecting rods, to automatically deflect the wheels, guiding the machine away from the obstacle which has been struck.

The body of the fender, designated as an entirety in the drawings by the numeral 10, is, as best illustrated in Fig. 3, substantially triangular in shape, and is of a box-like construction. Preferably the body 10 of the fender includes the bottom wall 11, side walls 12 and 13, rear wall 14 and the slanting top walls 15 and 15'. The rear corner portions of the top walls 15 and 15' are severed from the body of the walls and are then connected, as by hinges 16, so that they form doors through which access may be had to the interior of the fender body. A hasp and keeper, indicated at 17 in Fig. 3, may be provided for each of the doors 18 and 19, so that, in case the fender body is used as a tool box, the contents of the fender may be locked up to guard against molestation by unathorized persons. The forward terminals of the side walls 12 and 13 are bifurcated to form a slot 20 in the forward or apex portion of the fender body. This slot 20 receives a rubber tired buffing and deflecting wheel 21 which is journaled on a suitable spindle 22.

It will be obvious upon reference to Fig. 2 particularly that any object struck by the forward terminal of the fender will be engaged by the freely rotatable deflecting wheel 21, and will thus be deflected from the path of the oncoming vehicle so that it will engage the wing members indicated at 23 and 24. These wing members 23 and 24 are apertured at their forward terminals to receive U-bolts or other suitable fastening members 25 by which they are properly secured to the forward terminal portions of the fender side walls 12 and 13. In this connection it may be well to explain that while U-bolts are preferably employed, any other suitable or desired means may be utilized without in any way departing from the basic principle of this invention, which consists primarily in the provision of a pair of movable wing members which, upon being struck, will operate to automatically turn the wheels to guide the automobile away from the object which has been encountered.

The wing members 23 and 24 are preferably formed of sheet metal, although some other material may be employed if found expedient. The rear terminals of the wing members are, as indicated at 26, curved inwardly, and are equipped on their inner faces with the apertured attaching ears 27 and 28. To these apertured attaching ears 27 and 28 are pivotally connected the terminals of a rack bar 29. This rack bar 29 serves not only to operatively connect the wing members to the steering knuckles of the front wheels of the vehicle, but also act to normally space the wing members 23 and 24 from the sides of the fender body.

As shown in Fig. 1 particularly, a helical spring is wound about each terminal of the member 29, as indicated at A and B. These springs A and B bear at their outer terminals against the wings and at their inner terminals against those bearings which support the member 29. The springs are of equal length, and are of the same expansive strength, so that they act to yieldably hold the two wings 23 and 25 equidistantly spaced from the walls of the fender. The member 29 is provided with teeth, which, as indicated at 30, are arranged on each side of a smooth central portion 30'. The terminal portions of the member 29 are rounded, being formed in the nature of rods. These terminal portions of the rack bar are mounted for sliding movement through bearings or retaining clips 31 and 32 which are respectively mounted on the upper face and adjacent the forward terminal of the fender body supporting arms 33 and 34. These supporting arms 33 and 34 are preferably formed in the nature of metallic bars, and are secured at their rear terminals as by bolts 35 to the front axle of the automobile. These supporting arms 33 and 34 may be formed integrally with the metallic bottom wall 11 of the fender body, or may be formed separately and secured by bolts or other fastening means to this wall 11. It will be obvious upon reference to either Figs. 1 or 2 that the arms 33 and 34 serve to support the fender body 10 in the desired operative position in advance of the forewheels of the vehicle. In order to brace these supporting arms 33 and 34, and also as a means for providing a support for the pinion 36, there is provided a transverse brace bar 37, the terminals of which are bolted or otherwise connected, as at 38, to the forward terminal portions of the arms 33 and 34. The pinion 36 is journaled on a suitable spindle 39 which extends upwardly from the approximate center of the brace bar 37. As will be seen upon reference to either Figs. 1 or 2, the teeth 30 of the rack bar 29 and the pinion 36 are arranged to mesh, so that, when either of the wing members 23 or 24 is struck by a foreign object and moved inwardly toward the adjacent side wall of the fender body, the rack bar will effect the rotation of the pinion 36 with the consequent automatic turning or deflection of the front wheels through the medium of the link rods 40 and 41.

The purpose in forming the teeth 30 of the rack bar on each side of the smooth or unobstructed central portion 30' is to permit the driver of the machine to steer the wheels without moving the wings of the fender. It is now to be observed that while the teeth 30 of the rack bar will engage with the member 36 upon the slightest deflection of the wings, at ordinary times, the wheels may be steered, causing a rotation of the pinion 36, without causing this member to engage with the teeth of the rack bar. Thus in ordinary use the machine may be freely steered without requiring that the driver operate the wings of the fender.

The link rods 40 and 41 are connected at their inner terminals to the pinion 36 by a pivot bolt 42, and are pivotally connected at their outer ends to the terminal eyelets 43 which are formed on the forwardly extending arms 44 of the steering knuckles. In this connection, it may be well to explain that while in the preferred embodiment of this invention it has been found desirable to cast a special form of steering knuckle having an arm of the type indicated at 44, it is, of course, possible to connect the rods 40 and 41 to any standard type of steering knuckle by means of a split ring clamp and a separate arm.

From the foregoing description, it is thought that the operation of the fender will be readily appreciated, for it will be obvious that, when an obstacle is struck by the wheel 21 and deflected to engage one of the wings 23 and 24, or engages one of these wings in the first instance, the rack bar 29 will be moved transversely over the supporting arms 33 and 34, depending, of course, upon which wing member is subjected to the impact. The transverse movement of the rack bar 29 will, of course, through the engagement of the teeth 30 with the pinion 36, rotate this last-mentioned member and cause the links 40 and 41 to swing the bracket arms 44 with a resultant deflection of the forward wheels in a direction away from the obstacle which has been struck. Thus, not only does the fender serve as a means for protecting the front wheels, radiator and springs of the automobile against damage, but it also automatically acts to steer the machine away from the encountered object. It has been found desirable in practice, however, to add to the functions of the fender by connecting it with the clutch and brake pedals of the automobile, so that simultaneously and automatically with the striking of a foreign object against, the fender the clutch will be released, thus disconnecting the engine from the transmission shaft and applying the brakes for quickly bringing the machine to a stop. For this purpose, therefore, the rack bar 29 has been operatively connected to the clutch and brake pedals, indicated at 49 and 50 by a cable 51. This cable 51 is secured at its rear terminal by a ring 52 to a pair of springs 53 and 54, which are respectively connected to the pedals 49 and 50, as shown particularly in the diagrammatic view of Fig. 4. The cable is directed over a pulley 55 which is journaled in the lower terminal of a rod 56, depending from the engine bed or any other suitable portion of the automobile. The cable extends forwardly from the pedals and has its free end directed through an opening 57 which is formed in the rear wall 14 of the fender. The extreme forward terminal of the cable is connected to a helical spring 58, the forward terminal of which latter member is secured to a vertical brace or stay 59 carried within the fender, as shown particularly in Fig. 2.

A substantially U-shaped latch member 60, which is formed from a bar of metal, is secured to the cable, as in Figs. 2 and 5.
The latch member is preferably held in place by forming in the cable knots which will bear against the inner faces of the arms 61 and 62 of the latch. The spring 58 is of the retractive type, and normally tends to draw the cable forwardly, releasing the clutch pedal and applying the brake pedal. In order to overcome this tendency of the spring, and to provide means whereby the cable may be held in slack position until the wings 23 and 24 are moved inwardly under impact, there is provided a keeper, which is indicated as an entirety in Fig. 5 by the numeral 63. This keeper is formed from a bar of metal and is substantially L-shaped in conformation. The free terminal of the horizontal arm 64 of the keeper is provided with a downwardly extending lug 65 which is adapted to engage against the arm 62 of the latch for holding the cable in slack position against the tension of the spring 58. The vertical arm 66 of the keeper is mounted for sliding movement through an opening 67 formed in the bearing bracket 68. The bearing bracket 68 is bolted or otherwise suitably secured to the rear wall 14 of the fender. The lower terminal of the arm 66 is bifurcated, producing apertured ears 69, and between these ears is journaled a roller 70. It will now be observed upon reference to Fig. 2 particularly that the roller is arranged, when the fender has been assembled, to ride upon the rack bar 49.

Referring now particularly to Fig. 5, it will be seen that there is formed on the upper face of the rack bar at each side of the smooth space 30' a cam-shaped projection 71. It will be obvious that if the rack bar is moved transversely, as when the wings 23 and 24 are struck by a foreign object, that the roller 70 will be engaged by one of the members 71, and that as a consequence the vertical arm 66 of the keeper will be moved upwardly through the bracket 68. This upward movement of the keeper will, of course, withdraw the lug 65 from engagement with the arm 62 of the latch member, and the spring 58 will then pull the cable 5 forwardly with a resultant swinging of the clutch and brake pedals in the desired manner.

In concluding the description of this invention it is desired to emphasize the fact that the fender may be so attached to an automobile that it will perform three important offices—first, it will protect the machine against injury through impact against a foreign object or obstacle in the road; second, it will steer the machine away from any obstacle which may be struck, and third, it will automatically effect the disengagement of the clutch and the application of the brakes simultaneously with the encountering of an obstacle.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined in the appended claims.

Having thus described the invention, what is claimed as new is:—

1. The combination of a motor vehicle, of a fender rigidly secured to the forward portion thereof and having movable wing members, means operatively connecting the wing members to the front wheels of the vehicle, whereby the engagement of either wing with a foreign obstacle will automatically deflect the front wheels to steer the automobile in a direction away from the side of the fender receiving the impact, means freely connected to the clutch and brake pedals of the vehicle for throwing out the clutch and applying the brake simultaneously with the impact against either wing member, and means operable by the wing members for releasing said last mentioned means.

2. The combination with a motor vehicle, of a fender including a body adapted to be rigidly secured to the forward portion of the vehicle, movable wing members carried by the body of the fender, a deflecting wheel journaled in the forward end of the fender, a rack bar freely connecting the wings at their rearward terminals, pinions meshing with the rack bar, and link rods freely connecting the pinions to the steering knuckles of the front wheels of the vehicle, whereby the swinging movement of either wing caused by the engagement of the wings with a foreign obstacle will automatically and simultaneously deflect the front wheels to steer the vehicle away from the object which has been struck.

3. The combination with a motor vehicle, of a fender including a body adapted to be rigidly secured to the forward portion of the vehicle, movable wing members hinged at their forward portions to the forward portion of the body members, a transversely extending rack bar pivotally connected at its terminals to the rear terminals of the wings, yieldable means normally holding the rear terminals of the wings in spaced relation to the body, and means engageable by the rack bar and operatively connected to the steering knuckles of the front wheels of the vehicle whereby the flexing of each wing caused by the engagement of a wing with a foreign obstacle will automatically deflect the front wheels of the vehicle in a direction opposed to the wing which has been struck, a retractive spring operably connected to the clutch and brake pedals of the vehicle, vertically slidable means normally engaging the springs for rendering the same ineffective, whereby the clutch and brake pedals are free with respect to the springs, and means carried by the rack bar and engageable with said vertically slidable means for disengaging said slidable means from said spring upon the movement of either wing.

4. The combination with a motor vehicle, of a fender including a body member, movable wings carried thereby, a transversely extending rack bar operatively connecting the free rear terminals of the wings, a pinion adapted to be engaged by the rack bar upon the transverse movement of this member but normally free to rotate without engaging the rack bar, linkage operatively connecting the pinion to the steering knuckles of the front wheels of the vehicle, and flexible means yieldably connected to the clutch and brake pedals of the vehicle, said means normally tending to release the clutch and apply the brake, a locking device carried by the fender body and engageable with the first-mentioned means for holding said means in inoperative position, and means carried by the said rack bar and engageable with the locking device for releasing the locking device when the rack bar is moved transversely in response to the engagement of either wing with a foreign obstacle.

5. The combination with a motor vehicle, of a fender including a body member, movable wings carried thereby, a transversely extending rack bar operably connecting the free rear terminals of the wings, a pair of springs wound about the rack bar terminals thereof and bearing against the wing members, whereby said wing members are normally spaced equidistantly from opposite sides of the body member, and means operably connecting the rack bar to the front wheels of the vehicle, whereby the movement of either wing will cause the deflection of the front wheels.

6. The combination with a motor vehicle, of a fender including a body member, movable wings, a rack bar mounted for transverse sliding movement with respect to the vehicle, and normally pivoted to the rear terminals of the wing members, a spring arranged in the fender body, flexible means connecting the spring to the clutch and brake pedals of the vehicle, a catch member carried by the said flexible means, a keeper member carried by the fender body and engageable with the catch for normally rendering the spring inoperative with respect to the clutch and brake pedal, and cam members carried by the rack bar and engageable with the rack bar and the keeper member for disengaging the keeper from the catch simultaneously upon the movement of either wing member, whereby the spring may throw out the clutch and apply the brake through the said flexible means.

7. The combination with a motor vehicle, of a fender including a body member, movable wings carried thereby, a transversely slidable rack bar operatively connected to the front wheels of the vehicle and to the wing members for deflecting the wheels upon the movement of either wing, a spring arranged in the fender body and connected to the clutch and brake pedals of the vehicle, said spring being adapted to move the brake pedal into operative position and to move the clutch pedal into release position, a substantially U-shaped catch member associated with the spring, a substantially L-shaped keeper member mounted for vertical slidable movement and engageable with the catch member for normally rendering the spring inoperative with respect to the clutch and brake pedals, a roller carried by the lower terminal of the keeper, and transversely spaced cams carried by the rack bar, said cams being engageable with the roller upon the transverse movement of the rack bar for disengaging the keeper from the catch simultaneously with the movement of either wing member.

In testimony whereof I affix my signature in presence of two witnesses.

EDWARD E. POKORNY.

Witnesses:
W. O. MERRILL,
F. H. HAKEL.